Oct. 26, 1965    W. R. GRAHAM ETAL    3,214,030
ANIMAL CAGE SUPPORT

Filed Jan. 9, 1964    2 Sheets-Sheet 1

INVENTOR.
WALTER ROBERT GRAHAM
ROBERT G. CARLSON
BY
Robert E. Woodhams
ATTORNEY

Oct. 26, 1965   W. R. GRAHAM ETAL   3,214,030
ANIMAL CAGE SUPPORT
Filed Jan. 9, 1964   2 Sheets-Sheet 2

INVENTOR.
WALTER ROBERT GRAHAM
ROBERT G. CARLSON
BY
Robert E. Woodhams
ATTORNEY

United States Patent Office 3,214,030
Patented Oct. 26, 1965

3,214,030
ANIMAL CAGE SUPPORT
Walter Robert Graham and Robert G. Carlson, Kalamazoo, Mich., assignors to The Upjohn Company, Kalamazoo, Mich., a corporation of Delaware
Filed Jan. 9, 1964, Ser. No. 336,822
14 Claims. (Cl. 211—71)

This invention relates to an animal cage support apparatus and, more particularly, relates to modular wall hung apparatus for removably supporting a small animal cage and watering manifold associated therewith.

Apparatus embodying the present invention was developed to fulfill needs arising in laboratory animal rooms and in other locations at which large numbers of small animals are confined in a large number of cages. Typically, space limitations dictate that the cages must be stacked on top of one another in a closely spaced arrangement. Moreover, means must be provided for supplying food and water to animals within the cages and for removing or replacing animals therein. Further, means must be provided for maintaining the cages in a sanitary condition and for allowing removal and replacement thereof from their stacked condition. Finally, time spent by an attendant in maintaining such an animal room must be minimized for economic reasons.

A variety of prior art devices are known but generally fail to meet all these needs at an acceptable level. For example, in the past it has been common to stack a plurality of generally rectangular mesh cages on shelves of various types. Shelves, however, tend to gather dust and debris causing extra work for an attendant and extra sanitation dangers for the animal colony. Some previous cage support devices have omitted means for positively locating each cage, thus allowing cages to become disarranged and/or jammed in place thereby precluding efficient removal and replacement of cages for cleaning and the like. Certain prior art cage support devices have included fixed parts susceptible to gathering dirt and debris but which cannot be readily removed to a sink or the like for efficient cleaning. Further, some prior art cage supports have been incapable of supporting cages of more than one size or of supporting cages and servicing means therefor, such as a watering manifold.

Accordingly, the objects of this invention include:

(1) To provide an animal cage support apparatus for removably supporting a plurality of small animal cages and a watering manifold associated therewith.

(2) To provide an apparatus, as aforesaid, particularly adapted for holding a modular set of cages in closely spaced and horizontally aligned relationship with respect to a fixed vertical support surface and which is capable of conforming without modification to any of several moduli.

(3) To provide an apparatus, as aforesaid, which completely eliminates shelves or other horizontal fixedly mounted surfaces capable of gathering dust and debris and wherein each cage and a removable closure member covering an open face in said cage are readily and independently removed and replaced in precisely defined locations in the support apparatus.

(4) To provide an apparatus, as aforesaid, for removably holding a water line or manifold including animal activated drinking founts whereby placement of a cage in said support apparatus automatically inserts a fount into said cage for access thereto by animals within said cage.

(5) To provide an apparatus, as aforesaid, including an elongated strip fixed to an upstanding wall surface and which supports the remainder of the support apparatus, individual parts of said remainder of said support apparatus and said cages each being removable from said strip without tools and by a single simple movement and said strip being free of dirt collecting crevices or exposed upwardly facing surfaces of appreciable size.

(6) To provide an apparatus, as aforesaid, wherein cages of each horizontal row are supported independently of those in rows thereabove or below and wherein parts of the apparatus are extruded to minimize machining operations thereon and to provide a consistently good fit.

(7) To provide an apparatus, as aforesaid, including elongated cage supports cantilevered from said strip and defining grooves into which edges of basin-shaped cages and closure members therefor may be entrained, wherein each cage is supported by a cage support on each side thereof and each cage support is capable of supporting cages on both sides thereof.

(8) To provide an apparatus, as aforesaid, which may be inexpensively produced, which is particularly adapted to production in large quantities, which may be produced individually, which is readily constructed of noncorrosive material for easy cleaning and long life and which is capable of a long service life with a minimum of maintenance.

Other objects and purposes of this invention will be apparent to persons acquainted with apparatus of this general type upon reading the following specification and inspecting the accompanying drawings.

Figure 1:
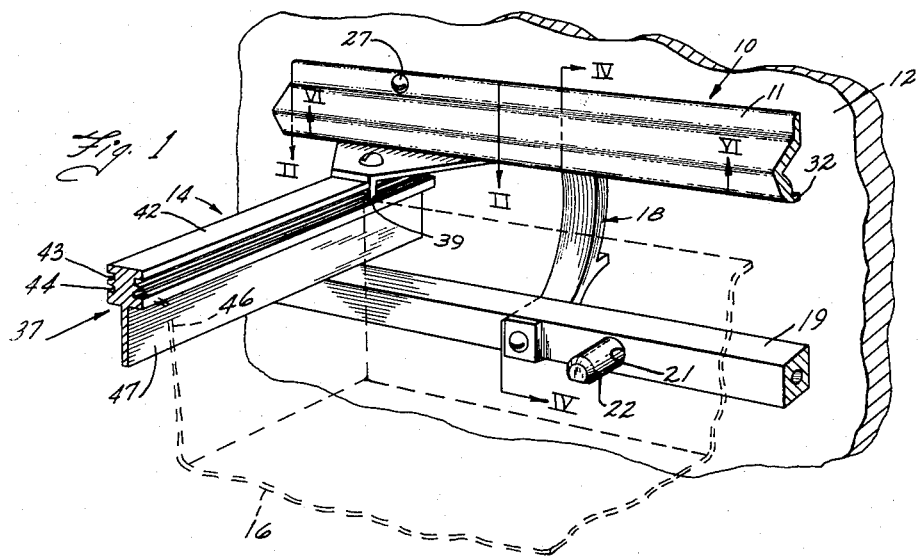
FIGURE 1 is a fragmentary perspective view of an animal cage support apparatus embodying the invention.

Certain terminology will be used in the following description for convenience in reference only and will not be limiting.

The words "upwardly," "downwardly," "rightwardly," and "leftwardly" will designate directions in the drawings to which reference is made. The words "inwardly" and "outwardly" will refer to directions toward and away from the vertical supporting surface upon which the apparatus embodying the invention is supported or, when specified, will refer to directions toward and away from the geometric center of parts of said apparatus. Said terminology will include the words above specifically mentioned, derivatives thereof and words of similar import.

*General description*

In general, the objects and purposes of the invention are met by providing an elongated bracket strip affixed essentially horizontally to a substantially vertical supporting surface and having a plurality of slots in the lower edge thereof. A spaced plurality of cantilevered cage supports each includes an upwardly and outwardly curved finger at the inner end thereof insertable into one of said slots in said bracket strip to prevent movement of said cage support away from or downwardly along said surface, said cage support contacting said surface below said bracket strip to preclude vertical pivoting thereabout. Each cage support includes horizontal grooves therein for removably supporting a cage and closure member therefor between adjacent ones of said cage supports whereby a plurality of closely spaced cages may be suspended in a horizontal row outwardly spaced from said surface and from a single bracket strip. The bracket strip has further openings along its lower edge for supporting a plurality of cantilevered manifold hangers upon which is mounted an extended water manifold for providing water to said cages.

Detailed description

Turning now to the drawings, FIGURE 1 discloses an animal cage support assembly 10 embodying the invention. Briefly, the assembly 10 includes a bracket strip 11 affixed to an upstanding panel 12 which may comprise the wall of a building or which may be an individual panel supported vertically by any convenient means (not shown). The bracket strip 11 supports a plurality of cantilevered cage supports, one of which is indicated at 14. Each spaced pair of said cage supports 14 supports therebetween a suitable cage, such as the rectangular, generally basin-shaped and open-topped cage indicated in broken lines at 16 in FIGURE 1. The bracket strip 11 also supports an elongated water line or manifold 19 by means of a plurality of manifold hangers 18 distributed at spaced intervals therealong. The manifold 19 has an outwardly extending water fount 22 at each cage location which is here shown for purposes of illustration to be of the type described in the copending application of Walter Robert Graham Serial No. 332,355, filed December 23, 1963 and which is received through a suitable opening 21 in the adjacent side wall of the cage 16.

Figure 6:
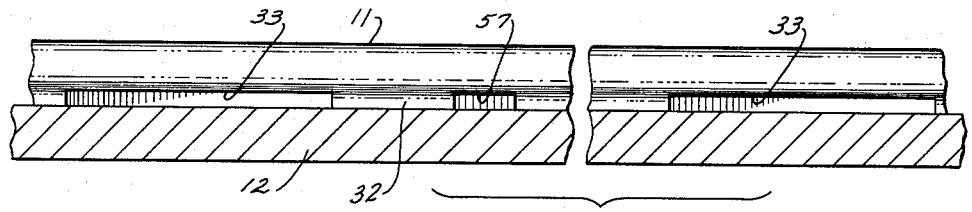
FIGURE 6 is a bottom view of the bracket strip of FIGURE 1.

Considering the parts of assembly 10 in more detail, the bracket strip 11 comprises an elongated element of essentially constant cross section having a top portion 26 (FIGURE 3) held in firm contact with the face of the panel 12 by means of screws 27 spaced therealong. The bracket strip 11 further includes an outwardly and downwardly sloped midportion 28 which connects to a downwardly and inwardly sloped bottom portion 29. The outward spacing of the mid and bottom portions 28 and 29 from the surface of the panel 12 defines a generally triangularly shaped chamber 31 therewithin. The bottom portion carries a relatively short, inwardly extending flange indicated in broken lines in FIGURE 3 at 32 and which contacts the panel 12. The bracket strip 11 includes a spaced plurality of openings 33 and 57 (FIGURE 6) along its lower edge which are defined by the removal of portions of the flange 32 and which are provided for supporting the cage supports 14 and manifold hangers 18, respectively. At least the openings 33 are preferably centered upon the screws 27. The openings 33 and 57 are preferably only sufficiently wide as to provide a clearance fit for said cage supports 14 (FIGURE 3) and manifold hangers 18 so as to prevent movement thereof axially of said bracket strip 11 and with respect to each other.

The cage supports 14 each comprises an attachment member 36 with an elongated arm 37 affixed thereto. The attachment member 36 comprises an essentially trapezoidally shaped central plate 38 including a depending flange 39 at the narrowed outer end thereof and an upwardly and outwardly curved finger 41 at the widened inner end thereof. The arm 37 (FIGURES 1 and 3) is of essentially constant cross section and includes a body part 42 of generally rectangular cross section having an identical pair of grooves 43 and 44 on each side thereof. Each cage 16 includes a lip 46 on each side thereof for insertion into one of the grooves 44. The grooves 43 slidably support suitable closure members (not shown) for said cages 46. The upper grooves 43 are preferably of rectangular cross section while the lower grooves 44 preferably have an outwardly and upwardly sloped upper surface to facilitate insertion of the lips 46 thereinto. The body part 42 includes depending fin 47 longitudinally aligned therewith. A transverse slot 48 appears in the upper surface of the arm 37 adjacent the inner end thereof.

In the assembled cage support 14, the attachment member 36 lies in contact with the upper surface of the arm 37 at the inner end thereof with the flange 39 received within the slot 48. The flange 39 is of sufficient width to enter the grooves 43 and 44 on both sides of the arm 37. A screw 49 which may be self-tapping, passes through the central plate 38 near the flange 39 and threadedly engages the arm 37 and with the flange 39 rigidly fixes the attachment member 36 to the arm 37.

Figures 3, 4:
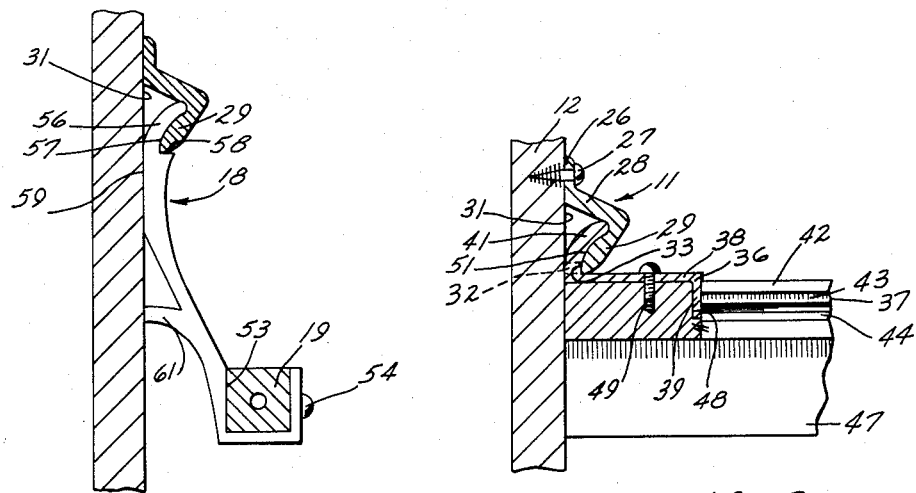
FIGURE 3 is a fragmentary sectional view taken on the line III—III of FIGURE 2.
FIGURE 4 is a fragmentary sectional view taken on the line IV—IV of FIGURE 1.

The cage support 14 may be installed on the bracket strip 11 by insertion of the upper end of the finger 41 into the desired one of the openings 33 followed by an upward and outward movement of said finger due to a counterclockwise pivoting, as seen in FIGURE 3, of the cage support 14 about the center of curvature of the finger 41 until the upper end of said finger 41 contacts the midportion 28 of the bracket strip 11 and the fin 47 contacts the panel 12. The bottom portion 29 of the bracket strip 11 preferably has a radiused inner surface 51 which continuously contacts the outer surface of the finger 41 when the cage support 14 is in its installed position of FIGURE 3. The coacting curves of the surface 51 and finger 41 allow smooth installation of the cage support 14 on the bracket strip 11 and lessen the unit pressure on the surface of the finger 41 when the cage support 14 is loaded with a cage 16.

The manifold hanger 18 (FIGURE 4) comprises a downwardly and outwardly curved, elongated member of constant cross section axially of the manifold 19. A generally square and upwardly opening groove 53 terminates the lower end of the hanger 18 for snug reception thereinto of the manifold 19. A screw 54 maintains the manifold 19 within the groove 53. The upper end of the manifold hanger 18 defines a finger 56, preferably identical to the hereinabove-discussed finger 41. The finger 56 may be inserted into the chamber 31 through an opening 57 similar to the opening 32 but of axial extent preferably only sufficient to clear the width of the manifold hanger 18. The manifold hanger 18 carries an upwardly facing step 58 outwardly of the finger 56 at the lower end thereof for limiting insertion of said manifold hanger 18 into the chamber 31. The inner face 59 of the manifold hanger 18 just below the finger 56 is flat for continuous contact with the surface of the panel 12 and the manifold hanger 18 carries an inwardly extending heel portion 61 adjacent the groove 53 for abutting the panel 12 and thereby limiting inward movement of the manifold 19. Thus, said manifold 19 is removably held in a fixed position with respect to and spaced outwardly from the panel 12.

Figure 5:
FIGURE 5 is a fragment of FIGURE 4 showing a modification.
Figure 2:
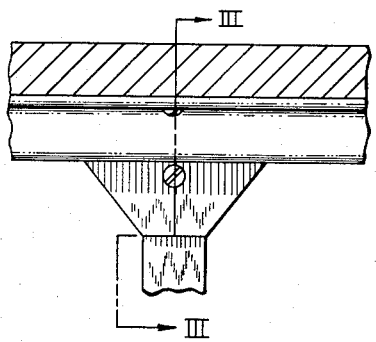
FIGURE 2 is a fragmentary sectional view essentially as taken on the line II—II of FIGURE 1.

FIGURE 5 discloses a cross sectional view of a modified bracket strip 11a. The bracket strip 11a is essentially identical to the bracket strip 11 except that the inner surface of the bottom portion 29a thereof is essentially planar and lacks the curve of the surface 51. It will be apparent that this modified bracket strip 11a will support the manifold hangers 18 and cage supports 14 just as firmly as the preferred bracket strip 11 but with a somewhat higher unit pressure loading at the points of said support.

Operation

Although the operation of the embodiment of the invention herein disclosed has been indicated somewhat above, the same will be given in detail hereinbelow to assure a more complete understanding of the invention.

To install the animal cage support assembly 10, the bracket strip 11 is affixed to a suitable vertical surface such as a panel 12 by any convenient means, such as the screws 27. The cage supports 14 and manifold hangers 18 may then be installed on said bracket strip 11 by insertion of the respective fingers 41 and 56 into the respective openings 33 and 57 followed by a pivoting of the outer ends of said cage supports 14 and hangers 18 about the center of curvature of said finger as hereinabove described. Although the manifold 19 may be installed on the manifold hangers 18 at any time, it will generally be more convenient to do so before installation of the hangers 18 on the bracket strip 11 whereby said hangers and said manifold may be installed as a unit on said bracket strip. Upon insertion of a pair of cage supports 14 into suitably spaced ones of openings 33, a cage 16 may have its edges 46 inserted into the grooves 44 of said cage supports 14, said cage 16 then being moved toward the panel 12 until the inner edge thereof abuts the flanges 39 on the attachment members 36. Thus, the flange 39 defines the limit of inward movement of the cage 16. If desired, a suitable closure member or cage cover (not shown) may be inserted into the upper grooves 43 of said cage supports 14 and may similarly be moved into engagement with the flange 39. Thus, the cage 16 and its cover may be returned to a precisely locatable position on the cage supports 14 after removal therefrom and the cages 16 in a row will be identically spaced from the panel 12. Further, proper spacing of the cage 16 from the manifold 19 is assured for inserting said drinking fount a proper distance into the cage 16 for actuation by animals therein. Location of the cage 16 and its cover in separate grooves in the cage support 14 allows independent removal or adjustment thereof.

The wide inner end of the attachment member 36 bears against the panel 12 and a corresponding width of the finger 41 bears on the bracket strip 11 to positively prevent horizontal rocking movement of the attachment member 36. Further, the depending flange 39 and slot 48 coact to prevent pivotal movement of the attachment member 36 with respect to the arm 37 about the screw 49. Thus, the cage supports 14 comprise rigid members held by the bracket strip 11 in parallel alignment. The close fit of the fingers 41 axially of the bracket strip 11 within the openings 33 assures a precisely defined spacing between the cage supports 14. Since the manifold 19 is firmly fixed to several hangers 18, the spaced plurality thereof prevents any rocking movement of the manifold 19 in a horizontal plane despite the narrowness of individual hangers 18.

Support of the cage supports 14 and manifold hangers 18 by means of openings in the lower edge of the bracket strip 11 allows the upwardly facing outer surfaces of said bracket strip 11 to be unbroken and sloped downwardly away from the panel 12 to minimize the depositing of dirt on such surfaces. Also, horizontal or other surfaces, such as the upper surface of the flange 32, likely to collect dirt are covered by the rest of the strip 11 to minimize any foreign matter build-up which might eventually make manipulation of the parts of the apparatus more difficult or which might provide a sanitation hazard for the animal colony. In fact, the only surfaces on the apparatus 10 in any way susceptible to supporting dirt and debris are located upon the removable portions thereof, specifically, the cage supports 14, manifold hangers 18 and manifold 19. Thus, parts which may require periodic cleaning are removable wtihout tools to a sink or other convenient washing site.

The openings 57 and 33 in one bracket strip 11 may be spaced on several modules. Thus, a single bracket strip 11 may at different times and without modification support a large number of relatively small cages or fewer large cages. The hangers 18 also may be spaced at different intervals.

Although a variety of materials and methods of construction may be employed to construct support apparatus according to the invention, a particular embodiment has used aluminum extrusions for the bracket strip 11, manifold hanger 18, attachment member 36 and arm 37 to minimize machining thereof and to assure a consistently good fit.

Although a particular preferred embodiment of the invention has been disclosed above for illustrative purposes, it will be understood that variations or modifications thereof which lie within the scope of the appended claims are fully contemplated.

What is claimed is:

1. In an animal cage support appparatus for supporting a plurality of animal cages and a water manifold associated therewith, the combination comprising:
   a bracket strip including a plurality of openings therein, said strip being adapted for mounting on upright panel means, such as a wall;
   cantilevered cage support means for entering selected ones of said openings, said cage support means extending away from said bracket strip and being adapted for supporting a cage between pairs thereof;
   hanger means for entering others of said openings, said hanger means extending to a point vertically offset from said cage support means and close to said panel means, whereby the manifold can be supported by said hanger means adjacent the side wall of a cage supported on said cage support means.

2. The apparatus defined in claim 1 wherein said bracket strip comprises an elongated element of essentially constant cross section including a top portion affixable to said panel means, a midportion extending downwardly and outwardly therefrom and a bottom portion extending inwardly and downwardly from said midportion, spaced-apart flanges extending from said bottom portion toward said panel means, said openings being formed by the spaces between said flanges.

3. The apparatus defined in claim 2 wherein the inner surface of said bottom portion is convex and is defined by a constant radius sweeping from said flanges to said midportion.

4. The apparatus defined by claim 1 wherein the openings in said bracket strip include at least one uniformly spaced set of relatively wide openings for reception thereinto of said cage support means and also includes a plurality of relatively narrow openings for reception thereinto of said hanger means.

5. The apparatus defined in claim 1 wherein said cage support means each comprises an elongated arm extending outwardly from sadi panel means for receiving a cage thereon, an upwardly and outwardly extending finger on the inner end of said cage support means for reception into one of said openings in said bracket strip and a depending fin resting against the panel means below said finger for cantilevering said cage support means outwardly from said panel means whereby said support means may be removed from said bracket strip by an upward motion of the outer end thereof and a corresponding downward motion of the inner end thereof for removing said finger from said bracket strip.

6. An animal cage support apparatus for supporting a plurality of animal cages and a water manifold associated therewith, the combination comprising:
   a bracket strip including a plurality of openings therein, said strip being adapted for mounting on upright panel means, such as a wall;
   cantilevered cage support means for entering selected ones of said openings and for supporting a cage between pairs thereof, said cage support means comprising an elongated arm of constant cross section contacting said panel means at the inner end thereof and extending outwardly therefrom, said arm comprising an essentially rectangular body part, at least one longitudinal groove on each side face of said body part for supporting a cage on either side of said body part, a transverse slot in the upper face of said body part adjacent the end thereof contacting said panel means, and an integral fin depending from said body part;

an attachment member including a central plate affixed to the upper side of said arm between said slot and said panel means, a flange depending from said central plate and lying in said slot, an upwardly and outwardly curved finger on said central plate insertable through one of said openings in said bracket strip, and said fin engaging said panel means; and hanger means for entering others of said openings and affixed to said manifold whereby cages supported on said cage support means will lie in a predetermined position with respect to said manifold.

7. The apparatus defined in claim 6 wherein the portion of said attachment member contacting said panel means and said bracket strip is wider than said arm to minimize pivoting of said cage support means in the plane of said plate and wherein the width of the opening containing said finger is sufficiently small as to minimize movement of said cage support means longitudinally of said bracket strip whereby to precisely space said arms with respect to each other.

8. The device defined in claim 6 wherein said depending flange extends outwardly of said grooves to define a limit past which a cage sliding in said groove may not pass.

9. The apparatus defined in claim 6 wherein there are a pair of vertically spaced grooves on each side of said arm for separate reception thereinto of said cage and of suitable cover means therefor.

10. The apparatus defined in claim 1 wherein said openings are distributed along said bracket strip in several spacing modules to permit different support means spacing and hanger means spacing for alternatively accommodating several different cage widths without replacing said bracket strip.

11. In an animal cage support apparatus for supporting a plurality of animal cages and a water manifold associated therewith, the combination comprising:

an upstanding panel and an elongated horizontally aligned bracket strip of constant cross section including an upper portion secured to said panel, an outwardly and downwardly angled midportion and a downwardly and inwardly angled bottom portion separated from said panel by a flange integral therewith, spaced portions of said flange being omitted to define a plurality of openings along the lower edge of said bracket strip;

a plurality of elongated cage supports each having an upwardly and outwardly curved finger on the inner end thereof for hooking into one of said openings in said bracket strip, a horizontally widened portion for contacting said panel and a depending fin for contacting said panel, said fin and finger acting against said bracket strip and panel to maintain said cage supports perpendicular to said panel, each of said cage supports including longitudinal grooves therein for removably supporting an end of a cage on each side thereof and including stop means in said grooves determining the spacing of said cage from said panel; and a plurality of manifold hangers each comprising an upwardly and outwardly curved finger identical to said finger of said cage support and for entering into predetermined ones of said openings of said bracket strip, said manifold hangers further each including upwardly opening channel means at the lower end of said manifold hangers for receiving said manifold thereinto and a heel extending inwardly from said manifold hanger adjacent the lower end thereof and into contact with said panel for maintaining said manifold outwardly of said panel in a cantilevered and precisely locatable position.

12. An animal cage support apparatus for supporting a plurality of animal cages and a water manifold associated therewith, the combination comprising:

a bracket strip including a plurality of openings therein, said strip being adapted for mounting on upright panel means, such as a wall;

cantilevered cage support means for entering selected ones of said openings and for supporting a cage between pairs thereof;

hanger means for entering others of said openings and affixed to said manifold whereby cages supported on said cage support means will lie in a predetermined position with respect to said manifold, said hanger means including an upwardly and outwardly curved finger at the upper end thereof receivable into one of said openings in said bracket strip, channel means at the lower end of said hanger means for receiving said manifold snugly thereinto and a heel portion adjacent the lower end of said hanger means extending into contact with said panel means, contact between said finger and said bracket strip and between said heel portion and said panel means acting to support said manifold in a location outwardly spaced from said panel means, said manifold and hanger means being removable from said panel means by an upward outward lifting motion thereof for allowing removal of said finger from said opening in said bracket strip.

13. An article support apparatus, comprising:

upright panel means;

an elongated bracket strip having an upright top portion affixed to said upright panel means, a midportion extending downwardly and outwardly therefrom and a bottom portion extending downwardly and inwardly toward said panel means, at least portions of the bottom edge of said strip being spaced from said panel means to form downwardly facing openings, said strip forming with said panel means an internal recess which is accessible through said openings;

a bracket having an upwardly extending finger at one end thereof which finger extends upwardly through one of said openings into said recess and bears against said strip whereby said bracket is supported on said strip, said bracket extending away from said strip and said panel means, said bracket having means for supporting an article thereon, said bracket also having means engageable with said panel means below said bracket strip to prevent downward swinging movement of said bracket, whereby said bracket can be removed from said strip by an upward swinging movement thereof.

14. An article support appaartus, comprising:

upright panel means;

an elongated bracket strip affixed to upright panel means, at least portions of the bottom edge of said strip being spaced from said panel means to form downwardly facing openings, said strip forming with said panel means an internal recess which is accessible through said openings;

a bracket having an upwardly extending finger at one end thereof which finger extends upwardly through one of said openings into said recess and bears against said strip whereby said bracket is supported on said strip, said bracket extending away from said strip and said panel means, said bracket having means for supporting an article thereon, said bracket also having means engageable with said panel means below said bracket strip to prevent downward swinging movement of said bracket, whereby said bracket can be removed from said strip by an upward swinging movement thereof.

References Cited by the Examiner

UNITED STATES PATENTS

| | | | |
|---|---|---|---|
| 2,572,624 | 10/52 | Jeter et al. | 211—87 |
| 2,793,092 | 5/57 | Peterson | 312—246 |
| 2,848,765 | 8/58 | Showalter | 20—57.5 |
| 2,872,006 | 2/59 | Payne et al. | 312—245 |
| 2,942,819 | 6/60 | Brogan | 248—58 |
| 3,025,122 | 3/62 | Millman | 312—245 |
| 3,051,427 | 8/62 | Alvarez | 248—224 |
| 3,057,269 | 10/62 | Artigalas et al. | 94—17 |
| 3,109,688 | 11/63 | Middleton | 312—246 |
| 3,125,068 | 3/64 | Hampton | 119—18 |
| 3,126,866 | 3/64 | Kubota | 119—18 |

CLAUDE A. LE ROY, *Primary Examiner.*